(12) United States Patent
Thomas (10) Patent No.: US 7,936,490 B2
(45) Date of Patent: *May 3, 2011

(54) SYSTEM AND METHODS FOR SHEARLESS HOLOGRAM ACQUISITION

(75) Inventor: Clarence E. Thomas, Knoxville, TN (US)

(73) Assignee: Third Dimension IP LLC, Knoxville, TN (US)

( * ) Notice: Subject to any disclaimer, the term of this patent is extended or adjusted under 35 U.S.C. 154(b) by 697 days.

This patent is subject to a terminal disclaimer.

(21) Appl. No.: 11/857,502

(22) Filed: Sep. 19, 2007

(65) Prior Publication Data

US 2009/0073522 A1  Mar. 19, 2009

Related U.S. Application Data

(63) Continuation of application No. 11/272,539, filed on Nov. 10, 2005, now Pat. No. 7,289,253.

(51) Int. Cl.
*G03H 1/26* (2006.01)
(52) U.S. Cl. .............................. 359/22; 359/11; 359/29
(58) Field of Classification Search .................. 359/11, 359/22, 29; 356/457
See application file for complete search history.

(56) References Cited

U.S. PATENT DOCUMENTS

| | | | |
|---|---|---|---|
| 6,809,845 B1 | 10/2004 | Kim et al. | |
| 2003/0016364 A1 | 1/2003 | Thomas et al. | |
| 2006/0103903 A1* | 5/2006 | Thomas | 359/11 |
| 2006/0181714 A1 | 8/2006 | Mater et al. | |

* cited by examiner

*Primary Examiner* — Alessandro Amari
(74) *Attorney, Agent, or Firm* — Law Offices of Mark L. Berrier (57) ABSTRACT

Systems and methods for shearless digital hologram acquisition, including an apparatus incorporating an illumination source configured to produce a first beam of light, which is then split by a beamsplitter into a reference beam and an object illumination beam. The reference beam is directed onto a phase-shaping optical element which imparts a phase shift to the reference beam and returns the phase-shifted reference beam on itself to the beamsplitter. The object illumination beam is directed onto an object, and a portion of the beam is reflected back to the beamsplitter, which combines the phase-shifted reference beam and object illumination beam substantially coaxially. The combined beams are passed through a focusing lens which focuses them at a focal plane. A digital recorder is positioned at the focal plane to record the spatially heterodyne hologram formed by the focused phase-shifted reference beam and reflected object illumination beam.

19 Claims, 5 Drawing Sheets

SYSTEM AND METHODS FOR SHEARLESS HOLOGRAM ACQUISITION

CROSS-REFERENCE TO RELATED APPLICATIONS

This application is a continuation U.S. patent application Ser. No. 11/272,539, entitled "System and Methods for Shearless Hologram Acquisition," filed Nov. 10, 2005, by Clarence E. Thomas, Jr., issued Oct. 30, 2007 as U.S. Pat. No. 7,289,253, which is incorporated by reference as if set forth herein in its entirety.

BACKGROUND

1. Field of the Invention

The present invention relates generally to the field of holography. More particularly, the present invention relates to systems and methods for shearless digital hologram acquisition system suitable for use with "white light" (spectrally broadband) or laser illumination, or two-color illumination. For two-color (more than two colors is also possible) implementations, the two colors may either both be broadband (low or very low coherence) illumination or laser illumination.

In one implementation, an LED (broadband light source) or laser is used for illumination, a diffractive or holographic optical element is used to create the required phase shift in a reference arm, and the hologram is recorded on a digital camera. In one implementation, advanced alignment and signal processing systems and methods, combined with the shearless geometry, afford a one-dimensional (1-D) FFT (Fast Fourier Transform) so that the processing time is substantially diminished compared to prior art systems that require a two-dimensional (2-D) FFT.

2. Related Art

Prior methods of heterodyne (spatial carrier frequency) classical holography and of digital hologram acquisition have required both laser (coherent) illumination and that the reference and object (target) beams be combined at some angle (there is a shear between the two beams). Lasers have a number of problems, including high expense and generally requiring very extensive safety precautions, which makes them even more expensive. Additionally, since lasers have long coherence lengths (compared to broader band illumination sources), small reflections from optical surfaces will interfere with and make significant noise in the digital hologram. Previous methods have also required an angle (shear) between the two beams to create the spatially heterodyne fringe pattern that actually records the hologram. The shear is created by reflecting the reference beam from a mirror or beamsplitter so that it propagates at a different angle than the object (target) beam. For common path systems, such as a Michelson geometry, or the last leg of a Mach-Zender geometry to the digital recorder, this means that the beams separate spatially from one another, and in fact makes it impossible to use a Michelson geometry for systems with high magnification—the reference beam becomes so separated due to the shear that it is either clipped by the optics, does not overlay the object beam, or both. Even with the shorter common path Mach-Zender layout, shear between the two beams often causes problems in achieving adequate overlay of the beams. For low-coherence illumination source beams it is substantially impossible in either geometry to get an exact enough overlay to form fringes with the prior art sheared systems. Another problem with prior art digital hologram acquisition systems is that they require a two-dimensional (2-D) FFT (Fourier transform) and inverse FFT to separate the object wave phase and amplitude from the hologram. The 2-D FFT/inverse FFT requires large computational power or a long wait. Another considerable problem with prior art systems is that they have no method for measuring phase changes greater than one wavelength or two-pi radians in a shearless geometry. This is a substantial disadvantage for holographic metrology.

Figure 1:
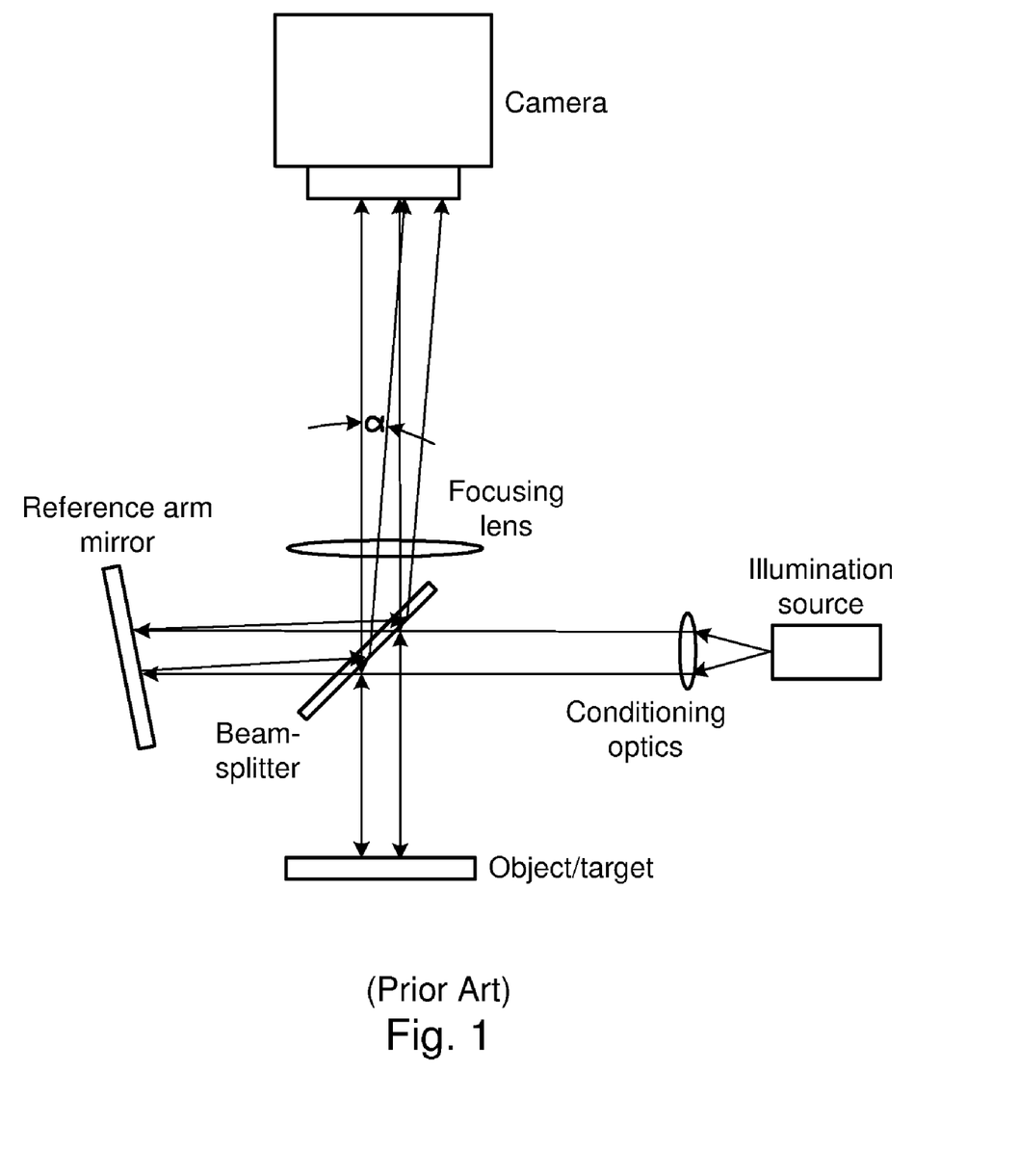
FIG. 1 illustrates a schematic of a prior art high-magnification Michelson system indicating that shear has caused the reference and object beams to no longer overlap.

FIG. 1 shows a prior art digital holography system with a Michelson geometry, where the shear angle between the two beams is indicated as $\alpha$. Note that for this particular case, nominally a high-magnification case, the reference and object beams no longer have any overlap, as indicated, and therefore cannot form a hologram.

There is therefore a particular need for systems and methods for 1) recording digital holograms in a shearless geometry, 2) recording digital holograms with broadband very short coherence length (both transverse and longitudinal) illumination, 3) recording digital holograms which extend the range of metrology substantially beyond one wavelength and 4) reducing the FFT computational requirements for separating the object wave phase and amplitude from the hologram.

SUMMARY OF THE INVENTION

This disclosure is directed to systems and methods for shearless hologram acquisition that solve one or more of the problems discussed above.

The disclosed systems and methods may provide for single-beam or two (or more) color operation, and for separation of the object beam phase and amplitude from the hologram. The shearless geometry is highly suited for two (or more) color operation with either broadband or laser illumination, and systems and methods are introduced herein to enable this advanced metrology technique. The multi-color operation with shearless geometry extends the measurement capability of holographic metrology so that third-dimension measurements can be made without ambiguity over a much wider range with excellent overlay of the object and reference beams in Michelson, Mach-Zender, or other geometry in a shearless fashion.

One apparatus for shearless recording of a spatially heterodyne hologram with broad-band or laser illumination includes: an illumination source or sources; a beamsplitter optically coupled to the illumination source(s); a reference beam phase-shaping optical element optically coupled to the beamsplitter; an object optically coupled to the beamsplitter; a focusing lens optically coupled to both the reference beam phase-shaping optical element and the object; and a digital recorder optically coupled to the focusing lens. A reference beam is incident upon the phase-shaping optical element, and the reference beam and an object beam are focused by the focusing lens at a focal plane of the digital recorder to form a spatially heterodyne hologram.

This system and corresponding methods provide advantages in that the object and reference beams are unsheared and do not separate from one another as they travel a common optical path in space. Additionally, since the beams can be substantially perfectly overlapped with the shearless system and methods, no expensive and potentially dangerous laser is required for the illumination source, although the system is also perfectly compatible with laser illumination and also provides tremendous advantages for the case of laser illumination. The systems and methods provide advantages in that computer assisted holographic measurements can be more easily and less expensively made with higher quality results. Additionally, the advanced systems and methods allow substantially decreased computation time or computational power by allowing the FFT's to be 1-D rather than 2-D, and two-color operation with the shearless geometry and 1-D FFT/IFFT provides a greatly expanded measurement range.

One particular embodiment comprises an apparatus to shearlessly record a hologram. The apparatus includes an illumination source configured to produce a first beam of light. The beam is split by a beamsplitter into a reference beam and an object illumination beam. The reference beam is directed onto a phase-shaping optical element which imparts a phase shift to the reference beam and returns the phase-shifted reference beam on itself to the beamsplitter. That is, the phase-shifted reference beam is returned in the same direction from which the non-phase-shifted reference beam was received, instead of being returned at an angle with respect to the received beam. The object illumination beam is directed onto an object, and a portion of the beam is reflected back to the beamsplitter. The beamsplitter receives the phase-shifted reference beam and object illumination beam and combines them substantially coaxially. The combined beams are passed through a focusing lens which focuses them at a focal plane. A digital recorder is positioned at the focal plane to record the spatially heterodyne hologram formed by the focused phase-shifted reference beam and reflected object illumination beam.

The illumination source may, for example, be a laser, light emitting diode (LED), a spectrally filtered incandescent light source, or an arc lamp. The phase-shaping optical element may, e.g., be a diffractive optical element with a blaze grating or a holographic optical element which is configured to impose a phase shift, such as a linear phase shift or repetitively increasing and decreasing phase shift, on the reference beam. The apparatus may include conditioning optics, such as a beam expander or spatial filter, positioned between the illumination source and the beamsplitter to optically process the first beam of light before it is received by the beamsplitter. The digital recorder may be a CCD or CMOS camera, and a digital storage medium may be coupled to the digital recorder to store the hologram data. The beamsplitter, the phase-shaping optical element, and the digital recorder may be configured according to various geometries, such as a Michelson geometry.

Another embodiment comprises a method for shearlessly recording a hologram. In this method, a beam of light is first provided. The beam is split into a reference beam and an object illumination beam. A phase shift is imparted to the reference beam, and an object is illuminated with the object illumination beam. The phase-shifted reference beam and a portion of the object illumination beam reflected from the object are then combined in a substantially coaxial manner. The phase-shifted reference beam and reflected object illumination beam are then focused at a focal plane, forming a spatially heterodyne hologram.

Numerous other embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting. Descriptions of well-known components and processing techniques are omitted so as to not unnecessarily obscure the present invention in detail.

As described herein, various embodiments of the invention comprise systems and methods for shearless hologram acquisition. Significant features of an apparatus for shearless digital hologram acquisition include the use of a phase-shaping optical element in the reference arm; using a broad-band illumination source with the optical paths, both longitudinal and transverse, matched to better than the longitudinal and transverse coherence lengths; arranging the system so that two (or more) colors can be used to record simultaneous holograms on the same digital camera exposure, or sequentially recording two (or more) colors on the same exposure by offsetting the direction of the carrier fringe recordation between the two (or more) colors; and building and aligning the system, or rotating the coordinate axes, so that the spatially heterodyne carrier frequency fringes are substantially aligned along either the x-axis or y-axis (or one color on the x-axis and one color on the y-axis for two-color recordation) of the system so that a 1-D FFT can be used rather than a 2-D FFT. The alignment can be replaced by axis rotations which make one axis of the coordinate system perpendicular to the carrier-frequency fringes of the object wave to be recovered from the hologram.

The systems and methods for advanced digital holography disclosed herein allow for the use of simpler optical systems, for the use of less expensive apparatus, for improved quality of digital hologram acquisition, and for improved methods of analysis of the hologram for determining the amplitude and phase of the original object wave at every recorded pixel. By contrast, the prior art does not describe any method for shearlessly forming a heterodyne (spatial carrier frequency) hologram. Shearless formation allows the use of the simpler Michelson geometry even in high magnification applications, and also remains an advantage for beam overlay even using the more complex Mach-Zender geometry. Neither does the prior art teach how to use broadband light for recordation of holograms, how to simultaneously or sequentially record holograms with two (or more) colors (either broadband or laser illumination) in a shearless geometry on the same digital camera exposure, or how to analyze the hologram for the original object wave phase and amplitude using only a one-dimensional (and therefore much faster) Fourier transform and inverse Fourier transform.

System Overview

Shear between the reference and object beam makes it impossible for the previous embodiments of digital holography to use a Michelson geometry at high magnifications, and prevents good overlay of the two beams (which is necessary for creation of fringes with broadband illumination) even in a Mach-Zender geometry. This problem is overcome by introducing a phase-shaping optical element (which can be a diffraction grating, holographic element, birefringent optical element, wedged glass, or other phase-modifying element), which modifies the phase of the wavefront without requiring reflection of the wave at a non-normal angle. Thus, after recombination, both the reference and object/target beams travel the optical path at substantially the same angle and can be overlaid substantially exactly on one another.

Additionally, prior-art embodiments of digital holography have not provided a shearless method for removing the ambiguity in phase measurements where the resolution-element-to-resolution-element difference in phase is greater than one wavelength. This problem is overcome by providing illumination at two or more different wavelengths or bands of wavelengths ("colors") with a phase-shaping optical element for each color in the reference arm, and simultaneously or sequentially recording the digital hologram on the same exposure of the recordation device at two (or more) wavelengths where the required spatial carrier-frequency fringes are created by the phase shaping optical elements, rather than combining the beams at an angle. Use of the phase-shaping optical element allows the two beams to be combined in a co-linear fashion so that they can be exactly overlaid and form satisfactory carrier-frequency fringes even with low-coherence or spectrally broadband illumination.

Additionally, this shearless method of forming the holograms greatly simplifies proper illumination of the recordation device with the best optical quality of each of the individual beams. In sheared geometries, it is often very difficult to properly illuminate the recordation device with both beams since the shear causes them to spatially separate. In order to separate the two unsheared holograms in Fourier-space (after an FFT), the fringes created in real space by the phase-shaping optical element for one of the colors are created with a significantly different x and y component of the carrier frequency, compared to the spatial carrier frequency fringes created by the other color, so that when the 1-D FFT is performed, the holograms are substantially separated from one another in Fourier space, and the object waves can therefore be reproduced without any interference or cross-talk between the colors. In general, one of the carrier frequencies will have a much higher x-component frequency and the other carrier frequency will have a much higher y-component frequency, thus allowing separation of the object waves in Fourier space.

Aligning the carrier-frequency fringes of a single-color (for either broadband or laser illumination) hologram substantially parallel to either the x or y-axis allows a 1-D FFT to be used without axis rotation to retrieve the object beam phase and amplitude from the complex hologram by performing a 1-D FFT on the axis perpendicular to the fringes, translating the zero-frequency (0) axis location to the carrier frequency location, filtering around the new axis, and performing an inverse 1-D FFT. For two-color digital holography, if the fringes for one color are parallel to the x-axis and the fringes for the second color are parallel to the y-axis, then a 1-D FFT along the x-axis, axis-translation to the carrier frequency, filtering operation, and 1-D inverse FFT can be used to recreate the phase and amplitude of the second color object wave, and a 1-D FFT along the y-axis, axis translation, filtering operation, and 1-D inverse FFT can be used to recreate the phase and amplitude of the first color object wave. Similarly, rather than aligning the fringes parallel to either the x-axis or y-axis, it is possible to perform a mathematical coordinate rotation so that one of the axes is perpendicular to the carrier-frequency fringes. The axis rotation method of alignment of a coordinate axis to one set of carrier frequency fringes is in general useful when more than two holograms are recorded on the same digital recordation device, or when mechanically aligning the system (so that the fringes are created parallel to one of the system axes) is not convenient. This is another variation which allows use of the 1-D FFT rather than the 2-D FFT. More generally, a coordinate rotation allows use of the 1-D implementation even when the carrier frequencies cannot be made exactly orthogonal in real-space or Fourier space. The only requirement is that the difference in frequency components between the carrier frequencies is large enough that the undesired carrier frequency shows up as a substantially different frequency in the FFT transform of the other carrier.

Note that, if desired, the methods described above can also be used for illumination sources of the same wavelength to either simultaneously or sequentially expose a single frame of the digital recordation device, thus allowing differential measurements of the target in the shearless geometry.

Detailed Description of Exemplary Embodiments

Shearless Digital Holography System

Figure 2:
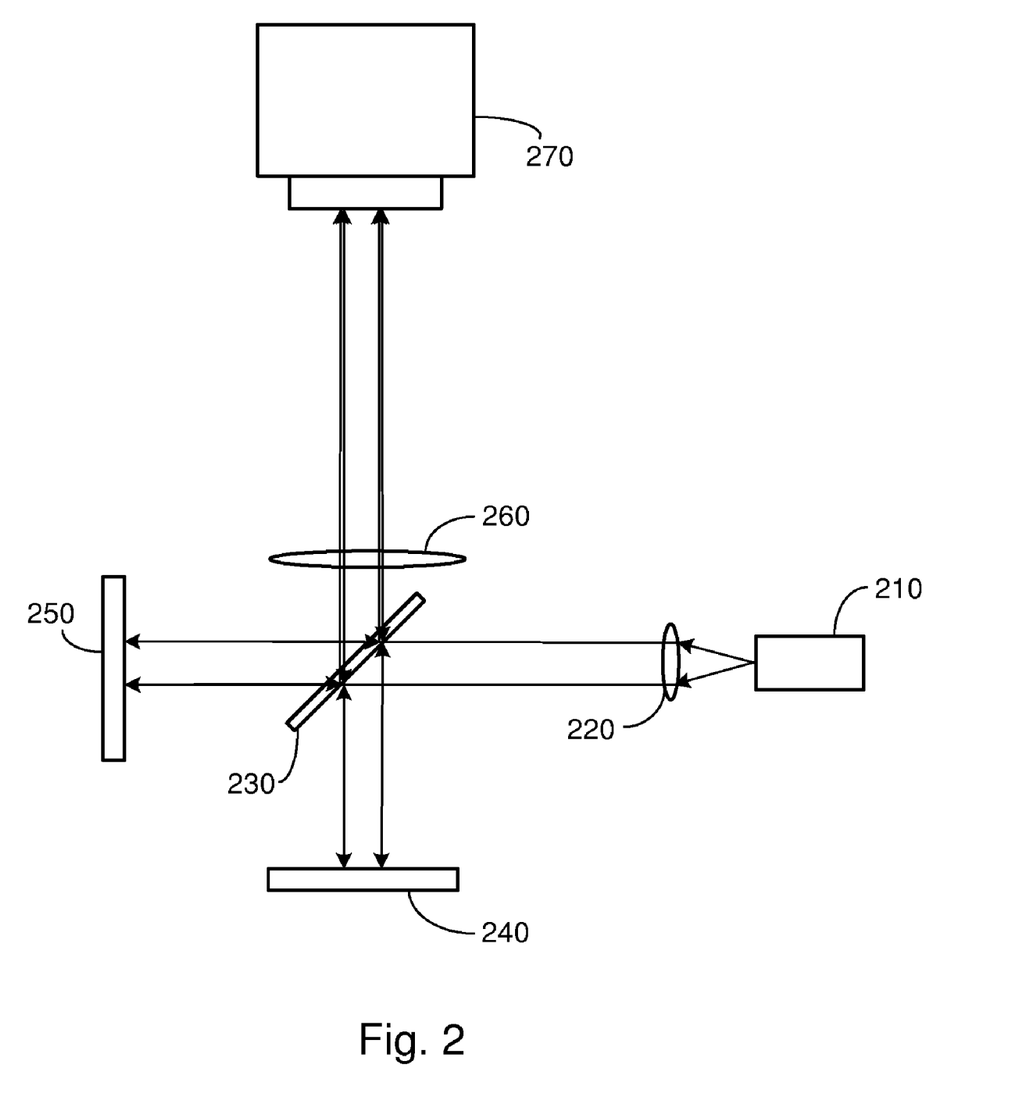
FIG. 2 shows a schematic of a particular embodiment of the present invention using Michelson Geometry, illustrating unsheared beams with diffractive or holographic Phase-Shaping Element in the Reference Arm.

Referring now to FIG. 2, a specific embodiment of a shearless holographic system is depicted. Light from an illumination source 210 passes through conditioning optics 220, which may (or may not) include collimation, filtering, diffusion, or other optical conditioning of the light from the illumination source. The beam from illumination source 210 is split by a beamsplitter 230 into object and reference beams. The object beam strikes the target object 240 and returns through the beamsplitter 230, while the reference beam is returned on itself by a phase-shaping optical element 250 (i.e., the returned beam is substantially coaxial with the original reference beam.) The phase-shifted reference beam is recombined with the object beam at the beamsplitter 230. The combined beams (the phase-shifted reference beam and the returned object beam) are substantially co-linear and overlaid. A focusing lens 260 then focuses both beams simultaneously onto the recording array plane of a digital camera 270, where the hologram and its spatial carrier frequency fringes created by the phase shift from the phase shaping optical element are recorded.

Examples of phase-shaping optical elements include: a holographic optical element formed by interfering counter-propagating co-linear waves where the hologram recording material is at an angle to the two beams; a blaze grating used in the −1 (minus one) order; a glass wedge followed by a mirror perpendicular to the beam path; a linearly increasing and decreasing glass wedge (the wedge reverses slope in a periodic fashion so that the average glass thickness is constant when averaged over a complete period for the wedge).

Two-Color Digital Holography System

Figure 3:
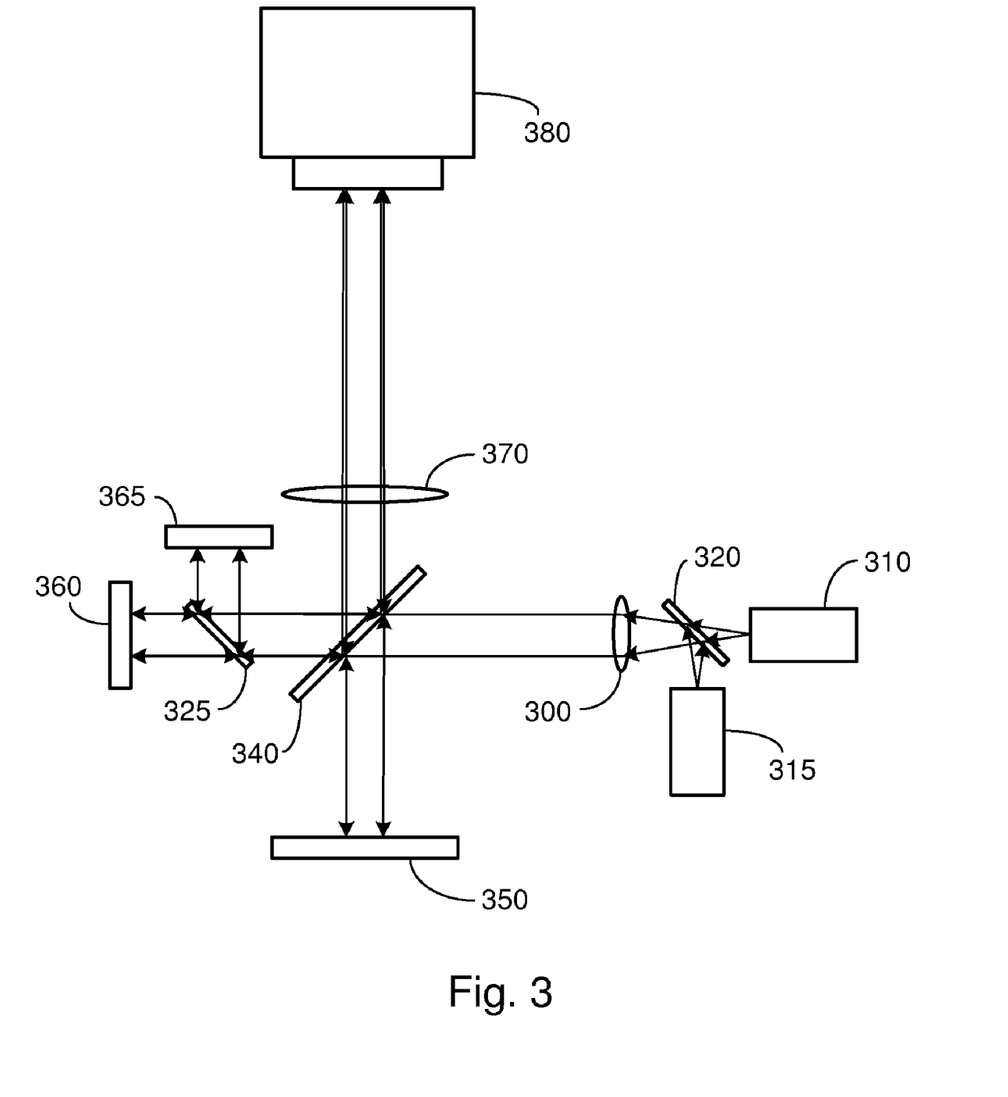
FIG. 3 illustrates a schematic of a Two-Color Digital Holography System with shearless geometry suitable for 1-D FFT analysis.

Referring now to FIG. 3, a specific embodiment of a two-color digital hologram acquisition system is depicted. This method is not limited to just two colors. Colors may be added to the system as long as the spatial carrier frequencies are arranged so that the object wave frequencies do not overlap in Fourier space. In this embodiment, light from two illumination sources (310, 315) is combined by a dichroic mirror 320 (which could also be a simple beamsplitter or other form of beam combiner). The light from the illumination sources then passes through conditioning optics 330, which may (or may not) include collimation, filtering, diffusion, or other optical conditioning of the illumination sources.

The substantially co-linear illumination beams (of both colors) are then split by a beamsplitter 340 into object and reference beams. The object beam strikes the target object 350 and returns through the beamsplitter 340, while the reference beam is split into both of its colors by a dichroic mirror 325 or some other type of splitting element. Each individual color reference beam is returned on itself by a phase-shaping optical element (360, 365), and the dichroic mirror 325 recombines the phase-shifted reference beams. Then, the combined reference beam is itself recombined with the object beam by the beamsplitter 340. For the case where the phase-shaping optical element returns the beams substantially on themselves, the reference and object beams will be substantially co-linear and overlaid on one another after recombination. A focusing lens 370 then focuses both beams simultaneously onto the recording array plane of a digital camera 380, which records the hologram and the spatial carrier frequency fringes created by the phase shift from the phase shaping optical element.

Figure 4A:
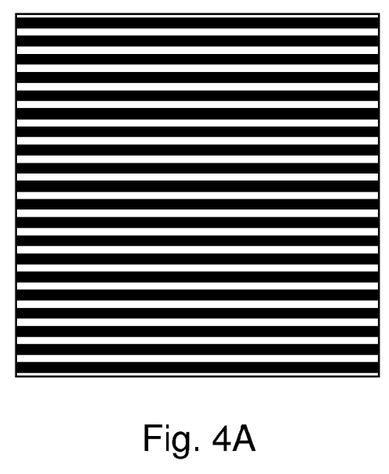
FIG. 4 shows an Example of Carrier Frequency Fringes suitable for separation of Object Waves using Two-Color Digital Holography. While orthogonal carrier frequencies in real and Fourier space are advantageous, all that is required for a 1-D FFT is the ability to mathematically rotate an axis perpendicular to the carrier frequency of interest.
Figure 4B:
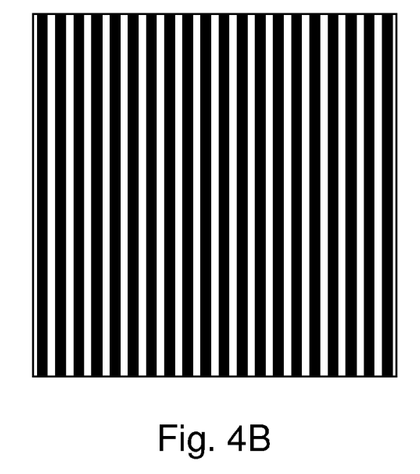
Figure 4C:
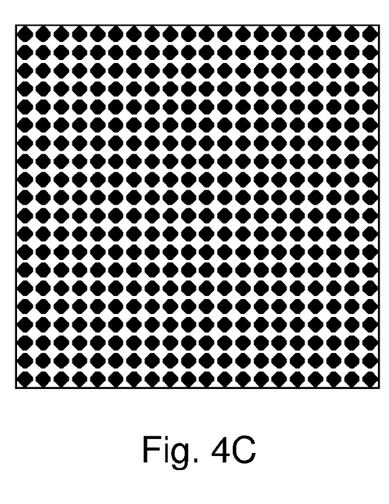
Figure 4D:
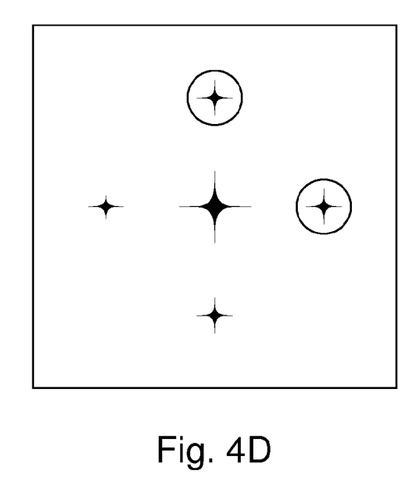

In order for the phase and amplitude of each color object beam to be individually separable from the other beams in Fourier space, the carrier frequency fringes in the camera recordation plane must be created at substantially different frequency components. FIGS. 4A-4D show an example where the carrier frequency fringes of Color 1 are perpendicular to the carrier frequency fringes of Color 2. It should be noted that the subject matter of the figures (e.g., carrier frequency fringes) comprise variations in intensity that are normally depicted by shades of gray. The figures are black and white representations of the subject matter, which is sufficient for the purposes of the following description. For example, FIG. 4A is presented for the purposes of illustrating the horizontal fringes formed by Color 1. Similarly, FIGS. 4B and 4C are presented to illustrate the vertical fringes formed by Color 2, and the combined fringes of both colors, respectively. FIG. 4D is presented to illustrate the 2-D FFT of the 2-color hologram in FIG. 4C.

FIG. 4A illustrates the carrier frequency fringes achieved by arranging the Phase Shaping Optical Element (which could also be a mirror since this method is also compatible with sheared holography) for Color 1, so that a linear vertical phase shift is created, resulting in horizontal fringes. FIG. 4B illustrates the carrier frequency fringes achieved by arranging the Phase Shaping Optical Element for Color 2 so that a linear horizontal phase shift is created, resulting in vertical fringes. FIG. 4C illustrates the simultaneous exposure of the digital camera to both fringe patterns. Finally, FIG. 4D shows the FFT of the image in FIG. 4C. Note that when the FFT is taken, the frequency component separation in x and y of the spatial carrier frequency fringe patterns from the two colors results in a total separation of the data in FFT space. The circles drawn on the figure indicate the separated sidebands for Color 1 and for Color 2.

While a 2-D FFT is used to illustrate the separation of the beams in Fourier space, only a 1-D FFT and Inverse Fast Fourier Transform (IFFT) are required to recover each of the Object Beams. Thus, a 1-D FFT perpendicular to the spatial carrier frequency fringes, translation of axes to the carrier frequency for Color 1, filtering operation, and an inverse FFT results in the phase and amplitude of the Object Wave for Color 1 only. A similar procedure results in recovery of the phase and amplitude of the Object Wave for Color 2 only.

Note that it is not necessary to use a 90-degree angle as the angle between the fringes of Color 1 and Color 2. Other angles are entirely possible, but the advantage of using the 90-degree angle is that no axis rotation is required if the two carrier frequency fringe sets are parallel to the x and y axes. A 1-D FFT and IFFT can be used to recover the phase and amplitude of the object waves even for the case where the two sets of carrier frequency fringes are not orthogonal. In this case, an axis rotation must be carried out so that one of the axes is perpendicular to the carrier frequency under consideration. A 1-D FFT can then be carried out along this axis and the zero frequency location translated to the carrier frequency, the result filtered to only include the object beam frequencies under consideration, and then an inverse FFT produces the phase and amplitude of only that object wave. In the case where neither carrier frequency for either of the two colors is parallel to an axis, an axis rotation must be performed for each color to align one axis perpendicular to the carrier fringes for that color. Following this by a 1-D FFT, translation, filtering, and IFFT for each respective color returns the phase and amplitude of each of the respective colors.

Once the complex Object Waves for Color 1 and Color 2 are recovered as described above, then without any further processing (other than possible coordinate rotations if necessary to place them both in the same coordinate system,) one of the Object Waves is divided by the other Object wave, corresponding pixel by corresponding pixel (e.g., the complex value of the Object Wave for Color 1 at pixel (1,1) is divided by the complex value of the Object Wave for Color 2 at pixel (1,1)). Since there is an average wavelength difference between the two colors, the resulting phase value created by dividing the two complex object waves by one another unambiguously extends the phase measurement range of the system. For instance, if there is a 10% difference in wavelengths between the two colors, then the phase measurement range over which phase is unambiguously measured is extended to 10 wavelengths (average wavelength divided by the difference between the two measurement wavelengths times the wavelength). This feature thus tremendously extends the usefulness of digital holographic measurements and makes it available in the very advantageous shearless geometry with only a 1-D FFT required.

One-Dimensional FFT for Object Wave Recovery

The use of a one-dimensional FFT for recovery of the Object Wave is illustrated by examining just one of the colors illustrated in FIG. 4. For instance, if the Phase-Shifting Optical Element is arranged so that a linear vertical phase shift is induced, as illustrated by the horizontal fringes in FIG. 4A, then only a 1-D FFT in the y-direction (vertical axis) is required to recover the object wave phase and amplitude. A one-dimensional FFT in the y-direction, followed by an axis translation to the carrier frequency, followed by a filtering operation, followed by a 1-D IFFT, extracts the phase and amplitude of the object wave only, using just a 1-D FFT and IFFT, not the 2-D FFT and IFFT required by all prior art. Note that the digital Fourier transforms need not be FFT and IFFT, many other digital Fourier transforms besides the Fast Fourier Transform (FFT) and Inverse Fast Fourier Transform (IFFT) will also work.

Use of Broadband Illumination for Digital Hologram Acquisition

It has been generally accepted that only highly coherent (laser) sources are suitable for holography, and digital holography has only been proposed using such sources in the prior art. In fact, although holography was invented in 1949, it languished on the shelf until the invention of lasers, followed by the invention of spatially heterodyne holography by Leith and Upatnieks. However, the use of laser illumination is not strictly required, and broadband ("white light") illumination can be advantageous in many situations. In particular, not having laser illumination can greatly reduce the cost and complexity of a digital holography system, since many lasers are very expensive and require considerable safety precautions to prevent injury to users or bystanders.

For systems that require extremely low noise, broadband illumination is also an advantage. In highly coherent systems, extraneous reflections from lens surfaces that reach the recording camera interfere coherently with the designed reference and object beams, creating noise in the carrier fringes. With broadband illumination, the reflections from the lenses have traveled a distance different by more than the coherence length from the path traveled by the designed beams, and therefore cannot interfere coherently with the reference and object beams. The carrier frequency fringe noise is thereby tremendously reduced.

Figure 5:
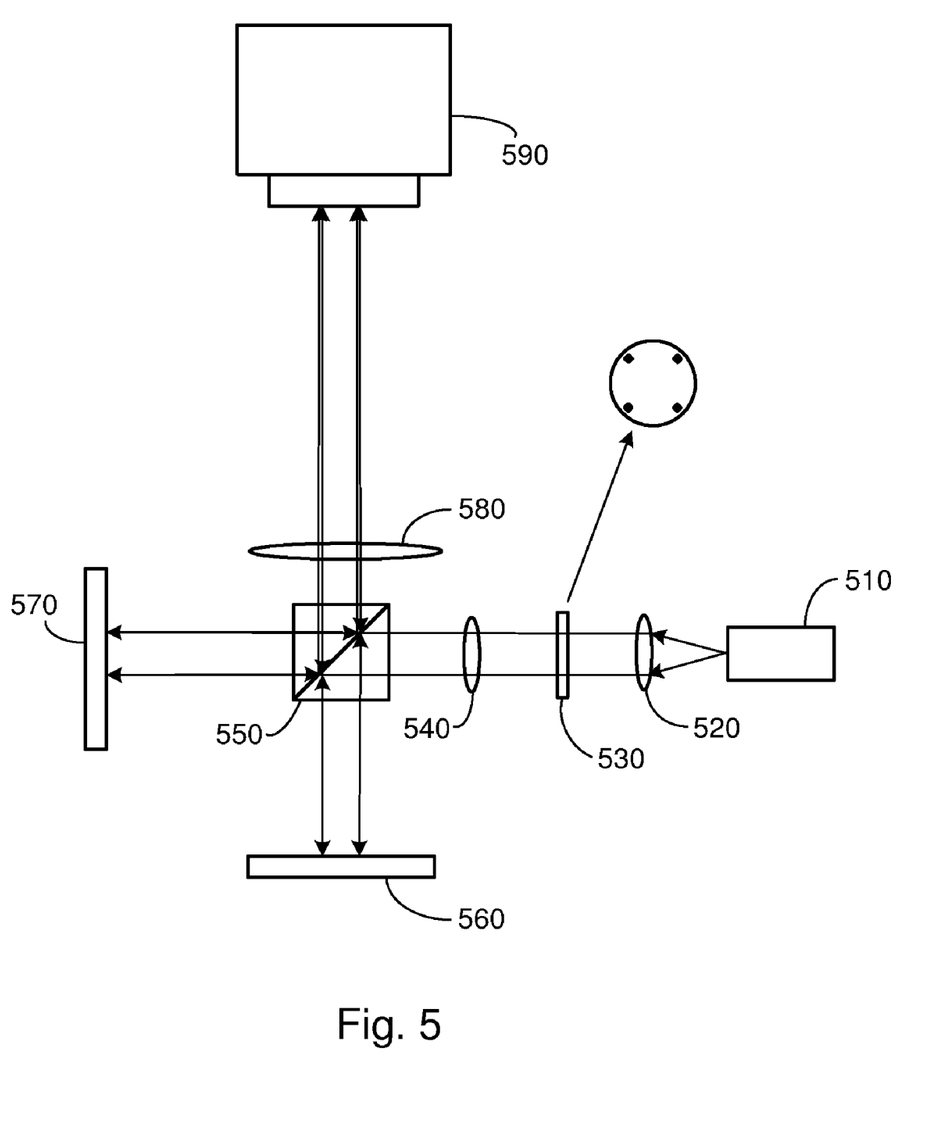
FIG. 5 depicts an example of a spectrally broadband illumination holography system with closely matched Reference and Object beam path lengths and reticle alignment target to allow precision overlay of the recombined beams at the digital camera.

FIG. 5 provides an example of a system using broadband illumination. In this system, light is provided by an illumination source 510, which in one embodiment may be a green LED. Light from illumination source 510 passes through conditioning optics 320, which may, as noted above, perform collimation, filtering, diffusion, or other optical conditioning of the light. In this embodiment, the light from illumination source 310 is also passed through a reticle 530 and a lens 540. The light beam is then split by a beamsplitter 550 into object and reference beams. In this embodiment, beamsplitter 550 is a split prism. The object beam strikes the target object 560 and returns through beamsplitter 550, while the reference beam is returned on itself by a phase-shaping optical element 570. The phase-shifted reference beam is recombined with the object beam at the beamsplitter 550 so that they are substantially co-linear and overlaid. A focusing lens 580 then focuses both beams simultaneously onto the recording array plane of a digital camera 590, where the hologram and its spatial carrier frequency fringes created by the phase shift from the phase shaping optical element are recorded.

In order to use broadband illumination, the path lengths for the reference and object beams must be very carefully matched, to a difference less than the longitudinal coherence length of the illumination:

$$\delta l < \delta^2/\delta\lambda,$$

where δl is the path length difference between the reference and object paths, λ is the average wavelength of the illumination source, and δλ is the spectral bandwidth of the illumination source. As an example, for illumination with a green LED of wavelength 530 nm and spectral bandwidth of 5 nm, the path lengths of the reference and object beams must be matched to better than ~56 microns. This is easily achievable by closely matching the design pathlengths and then providing a piezoelectrically driven longitudinal motion for the phase-matching optical element. Such piezoelectric stages can have motion resolution of 10 nm or less. Many other methods of precisely matching the path lengths are also available.

Additionally, the object and reference beams must be exactly matched to one another in the transverse dimension, much more exactly than in any prior art implementation. The two beams must be recombined so that the exact areas that were split apart are joined back together to an accuracy better than the transverse coherence length (Born & Wolf, Seventh (expanded) Edition, p. 575, replace ρ, the source size, by Rδθ where R is the distance from the beamsplitter to the recombination plane):

$$\delta r < (K\lambda_{avg})/(\delta\theta),$$

where δr is the allowable mismatch in overlay of the beams, K is a constant equal to 0.61 for no fringe contrast and smaller for good contrast, $\lambda_{avg}$ is the average wavelength of the broadband illumination source, and δθ is the divergence angle of the illumination source in radians. For instance, if the illumination source is a green LED with average wavelength of 530 nm, spectral bandwidth of 5 nm, and divergence angle after collimation of seven degrees, then the allowable error in overlay of the two beams is ~6.5 microns if we use K=0.3 (~33% spatial carrier frequency fringe contrast). Overlay of the two beams can be facilitated by passing the illumination beam through an alignment reticle 530 before splitting the beam, and arranging the optics such that the alignment reticle is also in focus at the digital recording plane. Clearly, in order to achieve this kind of overlay excellent optics and alignment must be used, but this is well within the actual state of the art.

Flat-Field Correction

The optical errors inherent in the system may be substantially removed by the method of flat-field correction. To make a flat field correction for reflection holography, the target is replaced by a flat reference surface which returns a plane wave. For a transmissive holography system, the object is simply removed from the system. A hologram is formed with the "perfect" target or with the target removed. The object wave from the "flat-field hologram" (reference hologram) is separated from the reference hologram by the standard methods of Fourier transform, axis translation, filtering, and Inverse Fourier transform. When a hologram is made of an object (target) to be analyzed, the complex object wave from the object under investigation may be divided by the complex object wave from the flat-field/reference hologram, and the optical wavefront errors and systematic noise are substantially removed from the measurement, greatly improving the accuracy of recreation of the object wave from the object/target under investigation.

Advantages

A shearless digital hologram acquisition system representing one embodiment of the invention is cost effective and advantageous for at least the following reasons. The shearless geometry allows a simpler Michelson geometry to be used for systems with arbitrary magnification, which is impossible with a sheared system, since the beams cease to overlap with one another (and therefore no hologram is created) for many implementations of the Michelson geometry. Even with a Mach-Zender geometry, the shear between the beams makes it difficult to adequately overlap the beams in many instances, and impossible for low coherence systems. For low coherence systems, the shearless geometry is a requirement, since it is otherwise impossible to overlap the beams so that they will interfere with one another—very low coherence illumination requires that the equivalent portions of the two beams overlap one another exactly. Use of the 1-D FFT, which is achieved by arranging the phase-shaping optical element so that the induced phase shift creates fringes parallel to either the x-axis or y-axis of the system or by rotating the coordinate system to have one axis perpendicular to the carrier frequency fringes, allows for substantially faster or less expensive (lower computational power) analysis of the holograms for separation of the object wave phase and amplitude from the raw spatially heterodyne hologram carrier frequency fringes.

There are many variations of the embodiments described above which are within the scope of the present disclosure and the appended claims. These variations may include, for example, the elimination of the focusing lens (e.g., 260,) which is used to eliminate the effects of diffraction. This may not be necessary for testing very flat optical surfaces, so the lens may not be used in some embodiments. In another alternative embodiment, the system may be configured so that the object illumination beam is passed through the target object, rather than being reflected from it. In an alternative embodiment of a multi-color system, the holograms of the different colors could be recorded by the recording device on separate frames, rather than a single frame. In another alternative embodiment, digital Fourier transforms or other kinds of frequency transforms could be used instead of the FFT's described above.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. An apparatus to shearlessly record a hologram comprising:
   an illumination source configured to produce a first beam of light;
   a first beamsplitter configured to split the first beam into a reference beam and an object illumination beam;
   a phase-shaping optical element configured to impart a spatially varying phase shift to the reference beam;
   a recombining optical element configured to receive the phase-shifted reference beam and a first portion of the object illumination beam which has interacted with an object and to substantially coaxially combine the phase-shifted reference beam and the first portion of the object illumination beam; and
   a recorder positioned at a first plane and configured to record a spatially heterodyne hologram formed by the substantially coaxial phase-shifted reference beam and the first portion of the object illumination beam.

2. The apparatus of claim 1 wherein the first beamsplitter, the recombining optical element, the phase-shaping element and the recorder are configured to form a Mach-Zender geometry.

3. The apparatus of claim 1 wherein the first beamsplitter, the phase-shaping optical element, and the recorder are configured according to a Michelson geometry wherein the first beamsplitter also serves as the recombining optical element.

4. The apparatus of claim 1 wherein a focusing element focuses the portion of the object illumination beam at the first plane at which the recording device is positioned.

5. The apparatus of claim 4 wherein both the phase-shifted reference beam and the portion of the object illumination beam are focused by the focusing element.

6. The apparatus of claim 1 wherein the object beam interacts with the object by transmission through the object.

7. The apparatus of claim 1 wherein the object beam interacts with the object by reflection from the object.

8. The apparatus of claim 1 wherein the object beam interacts with the object by scattering from the object.

9. An apparatus to recover the object beam phase and amplitude from a spatially heterodyne holography system comprising:
   a spatially heterodyne hologram recordation system wherein spatial carrier-frequency fringes of a recorded spatially heterodyne hologram lie substantially perpendicular to an axis of the system; and
   a computational device configured to perform one-dimensional Fourier transforms on the axis, thereby recovering the object illumination beam phase and amplitude, and further configured to output the object illumination beam phase and amplitude to a user.

10. The apparatus of claim 9, wherein the spatially heterodyne hologram recordation system comprises:
    a first beamsplitter configured to split the first beam into a reference beam and an object illumination beam;
    a phase-shaping optical element configured to impart a spatially varying phase shift to the reference beam;
    a recombining optical element configured to receive the phase-shifted reference beam and a first portion of the object illumination beam which has interacted with an object and to substantially coaxially combine the phase-shifted reference beam and the first portion of the object illumination beam; and
    a recorder positioned at a first plane and configured to record a spatially heterodyne hologram formed by the substantially coaxial phase-shifted reference beam and the first portion of the object illumination beam.

11. An apparatus to shearlessly record multiple-frequency or multiple-color holograms comprising:
    a plurality of illumination sources of different wavelengths configured to produce at least a first beam of light of a first wavelength and a second beam of light of a second wavelength;
    a plurality of beamsplitters with at least a first beamsplitter configured to combine at least the first beam and the second beam;
    a second beamsplitter configured to split the combined beams into a reference beam, and an object illumination beam;
    a plurality of phase-shaping optical elements configured to impart a separate spatially varying phase shift to each wavelength of the reference beam, with at least a first phase-shaping optical element for the first wavelength configured to impart a first spatially varying phase shift at a first spatial angle to the first wavelength of the reference beam and a second phase-shaping optical element for the second wavelength configured to impart a second spatially varying phase shift at a second spatial angle to the second wavelength;

a recombining optical element;

wherein the recombining optical element is configured to receive the phase-shifted reference beam and a portion of the object illumination beam which has interacted with an object, and to substantially coaxially combine the phase-shifted reference beam and the portion of the object illumination beam which has interacted with the object; and a recorder positioned at a focal plane and configured to record a plurality of holograms comprising at least a first spatially heterodyne hologram formed by the substantially parallel phase-shifted first wavelength of the reference beam and the first-wavelength portion of the object illumination beam, and a second spatially heterodyne hologram formed by the substantially parallel phase-shifted second wavelength of the reference beam and the second-wavelength portion of the object illumination beam.

12. The apparatus of claim 11, further comprising a first computational device configured to divide the phase and amplitude hologram formed by the first wavelength pixel-by-pixel by the phase and amplitude hologram formed by the second wavelength, thereby forming a differential phase hologram with a wavelength longer than the first and second wavelengths.

13. An apparatus to recover phase and amplitude of object beams of a dual-frequency spatially heterodyne holography system, comprising:

a dual-frequency spatially heterodyne hologram recording system wherein carrier-frequency fringes of a first-frequency hologram lie substantially perpendicular to a first coordinate axis, and carrier-frequency fringes of a second-frequency hologram lie substantially perpendicular to a second coordinate axis;

one or more computational devices configured to perform one-dimensional Fourier transforms on the first axis, thereby recovering the object illumination beam phase and amplitude of the first-frequency hologram, and further configured to perform one-dimensional Fourier transforms on the second axis, thereby recovering the object illumination beam phase and amplitude of the second-frequency hologram; and one or more output devices configured to output the object illumination beam phase and amplitude of the first-frequency hologram to a user and further configured to output the object illumination beam phase and amplitude of the second-frequency hologram to the user.

14. A method for shearlessly recording a hologram comprising:

providing a first beam of light;

splitting the first beam into a reference beam and an object illumination beam;

imparting a spatially varying phase shift to the reference beam;

combining in a substantially coaxial manner the phase-shifted reference beam and a first portion of the object illumination beam which has interacted with an object; and recording a spatially heterodyne hologram formed at a first plane by the phase-shifted reference beam and the first portion of the object illumination beam.

15. A method for shearlessly recording a multiple-frequency or multiple-color hologram comprising:

providing a plurality of beams of light of different wavelengths wherein a first one of the beams has a first wavelength and a second one of the beams has a second wavelength;

combining the plurality of beams into a coaxial beam of light;

splitting the coaxial beam into a reference beam and an object illumination beam;

imparting a first spatially varying phase shift at a first angle to a first portion of the reference beam having the first wavelength and a second spatially varying phase shift at a second angle to a second portion of the reference beam having the second wavelength;

combining, in a substantially coaxial manner, the phase-shifted reference beam and a portion of the object illumination beam which has interacted with an object; and recording a plurality of holograms formed at a first plane, wherein the holograms comprise at least a first spatially heterodyne hologram formed by the phase-shifted reference beam having the first wavelength and the portion of the object illumination beam having the first wavelength, and a second spatially heterodyne or spatial carrier frequency hologram formed by the phase-shifted reference beam having the second wavelength and the portion of the object illumination beam having the second wavelength.

16. The method of claim 15 further comprising:

dividing the phase and amplitude hologram formed by the first wavelength pixel-by-pixel by the phase and amplitude hologram formed by the second wavelength, thereby forming a differential phase hologram with an effective wavelength longer than the first and second wavelengths.

17. A method for recovering the object beam phase and amplitude from a spatially heterodyne holography system in which the spatial carrier-frequency fringes of a recorded spatially heterodyne hologram lie substantially perpendicular to an axis of the system, comprising:

performing one-dimensional Fourier transforms on the axis substantially perpendicular to the hologram carrier-frequency fringes of the recorded hologram, thereby recovering the object illumination beam phase and amplitude; and providing the object illumination beam phase and amplitude as output to a user.

18. The method of claim 17, further comprising recording the spatially heterodyne hologram prior to performing one-dimensional Fourier transforms, wherein recording the spatially heterodyne hologram comprises:

providing a first beam of light;

splitting the first beam into a reference beam and an object illumination beam;

imparting a spatially varying phase shift to the reference beam;

combining in a substantially coaxial manner the phase-shifted reference beam and a first portion of the object illumination beam which has interacted with an object; and recording a spatially heterodyne hologram formed at a first plane by the phase-shifted reference beam and the first portion of the object illumination beam.

19. A method for recovering the object beams phase and amplitude from a dual-frequency spatially heterodyne holography system in which the spatial carrier-frequency fringes of a first-color portion of a hologram lie substantially perpendicular to a first axis and the spatial carrier-frequency fringes of a second-color portion of the hologram lie substantially perpendicular to a second axis, comprising:

performing one-dimensional Fourier transforms on the axis substantially perpendicular to the first-frequency carrier-frequency fringes of the hologram, thereby recovering the first-color object illumination beam phase and amplitude; and performing one-dimensional Fourier transforms on the axis substantially perpendicular to the second-frequency carrier-frequency fringes of the hologram, thereby recovering the second-frequency object illumination beam phase and amplitude;

providing the first-color object illumination beam phase and amplitude as output to a user; and providing the second-color object illumination beam phase and amplitude as output to a user.

* * * * *